United States Patent
Mauritz

(10) Patent No.: US 12,448,030 B2
(45) Date of Patent: Oct. 21, 2025

(54) STEERING DRIVE FOR A STEERING AXLE OF A STEERABLE VEHICLE, STEERING AXLE, AND INDUSTRIAL TRUCK

(71) Applicant: ZF Friedrichshafen AG, Friedrichshafen (DE)

(72) Inventor: Wolfgang Mauritz, Fürstenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 477 days.

(21) Appl. No.: 18/056,010

(22) Filed: Nov. 16, 2022

(65) Prior Publication Data

US 2023/0159088 A1 May 25, 2023

(30) Foreign Application Priority Data

Nov. 22, 2021 (DE) ............. 10 2021 213 063.1

(51) Int. Cl.
*B62D 5/04* (2006.01)
(52) U.S. Cl.
CPC ......... *B62D 5/0421* (2013.01); *B62D 5/0403* (2013.01)
(58) Field of Classification Search
CPC ............................ B62D 5/0421; B62D 5/0403
See application file for complete search history.

(56) References Cited

U.S. PATENT DOCUMENTS

| | | | |
|---|---|---|---|
| 2,913,063 A | 11/1959 | Brown | |
| 4,461,367 A | 7/1984 | Eichinger et al. | |
| 4,930,590 A | 6/1990 | Love et al. | |
| 5,087,229 A | 2/1992 | Hewko et al. | |
| 5,327,986 A | 7/1994 | Saita | |
| 5,722,501 A | 3/1998 | Finch et al. | |
| 5,779,588 A | 7/1998 | Mann et al. | |
| 5,828,972 A | 10/1998 | Asanuma et al. | |
| 6,026,925 A * | 2/2000 | Nagao | B62D 5/043 180/444 |

(Continued)

FOREIGN PATENT DOCUMENTS

| | | |
|---|---|---|
| DE | 1630616 A | 7/1971 |
| DE | 19911458 A1 | 10/1999 |

(Continued)

OTHER PUBLICATIONS

German Patent Office, Office Action issued in German patent application No. 10 2021 213 068.2 (Sep. 26, 2022).

(Continued)

*Primary Examiner* — Jacob D Knutson
(74) *Attorney, Agent, or Firm* — Finch & Maloney PLLC

(57) ABSTRACT

A steering drive includes an electric motor with a motor shaft and a steering lever rotatable about a pivot axis. A first planetary stage has a first sun gear, first planet gears, a first ring gear, and a first planet carrier. A final planetary stage has a final sun gear, final planet gears, a final ring gear, and a final planet carrier. A force flow runs from the motor shaft to the first sun gear, and from the first sun gear via the first planet gears to the first planet carrier and to the first ring gear. The force flow runs via the final sun gear and via the final planet gears to the final ring gear, runs from the first ring gear and from the final ring gear to the steering lever, and runs via a first sun gear shaft from the electric motor to the first sun gear.

12 Claims, 1 Drawing Sheet

(56) References Cited

U.S. PATENT DOCUMENTS

| | | | |
|---|---|---|---|
| 6,039,143 A | 3/2000 | Kielar et al. | |
| 6,125,963 A | 10/2000 | Staiger | |
| 6,279,676 B1 | 8/2001 | Peppler | |
| 6,349,781 B1 | 2/2002 | Kruse | |
| 6,367,571 B1 | 4/2002 | Schwarz | |
| 6,505,700 B2 | 1/2003 | Furumi et al. | |
| 6,523,632 B1 | 2/2003 | Hanaoka et al. | |
| 6,691,819 B2 | 2/2004 | Menjak et al. | |
| 6,854,555 B2 | 2/2005 | Raue | |
| 7,497,286 B2 | 3/2009 | Keller et al. | |
| 7,549,502 B2 | 6/2009 | Gaetani | |
| 7,588,113 B2 | 9/2009 | Scharfenberg | |
| 7,591,340 B2 * | 9/2009 | Scharfenberg | B60K 7/0007 180/411 |
| 7,617,890 B2 | 11/2009 | Romig | |
| 7,621,360 B2 | 11/2009 | Stuebner et al. | |
| 7,669,684 B2 | 3/2010 | Rogg | |
| 7,686,125 B2 | 3/2010 | Andersson | |
| 7,789,784 B2 | 9/2010 | Hayashi et al. | |
| 7,803,085 B2 | 9/2010 | Himmelmann | |
| 7,861,820 B1 | 1/2011 | Goodwin et al. | |
| 8,025,116 B2 | 9/2011 | Rogg | |
| 8,312,959 B1 | 11/2012 | Schneider et al. | |
| 8,439,152 B2 | 5/2013 | Visscher | |
| 8,449,424 B2 | 5/2013 | Schoon | |
| 8,950,520 B2 | 2/2015 | Hauser et al. | |
| 9,669,865 B2 | 6/2017 | Schröder et al. | |
| 10,293,847 B2 | 5/2019 | Calmettes et al. | |
| 10,479,399 B2 | 11/2019 | Beyerlein et al. | |
| 10,526,004 B2 | 1/2020 | Witte | |
| 10,556,617 B2 | 2/2020 | Wang et al. | |
| 10,647,346 B2 | 5/2020 | Cai et al. | |
| 10,730,546 B2 | 8/2020 | Ognibene | |
| 11,312,412 B2 | 4/2022 | Kim | |
| 11,325,638 B2 | 5/2022 | Wang et al. | |
| 11,358,636 B2 | 6/2022 | Visscher et al. | |
| 11,427,272 B2 | 8/2022 | Li et al. | |
| 11,511,793 B2 | 11/2022 | Anetzberger | |
| 11,554,807 B2 | 1/2023 | Kondo et al. | |
| 11,608,106 B2 | 3/2023 | Nakamura et al. | |
| 11,679,801 B2 | 6/2023 | Kondo et al. | |
| 11,685,427 B2 | 6/2023 | Major et al. | |
| 11,712,964 B1 | 8/2023 | Drach et al. | |
| 11,939,008 B2 | 3/2024 | Ko et al. | |
| 12,097,911 B2 | 9/2024 | Ooba et al. | |
| 12,122,463 B2 | 10/2024 | Ishihara et al. | |
| 2006/0055139 A1 | 3/2006 | Furumi et al. | |
| 2006/0278466 A1 | 12/2006 | Cheng | |
| 2022/0212714 A1 | 7/2022 | Span et al. | |
| 2023/0052313 A1 | 2/2023 | Cai et al. | |
| 2023/0159083 A1 * | 5/2023 | Mauritz | B62D 5/0427 180/400 |
| 2023/0159085 A1 | 5/2023 | Stammberger et al. | |
| 2023/0159087 A1 | 5/2023 | Mauritz et al. | |
| 2023/0159088 A1 | 5/2023 | Mauritz | |
| 2023/0159097 A1 | 5/2023 | Mauritz et al. | |
| 2023/0174141 A1 | 6/2023 | Mauritz | |
| 2023/0373245 A1 | 11/2023 | Pfeffer et al. | |
| 2024/0132145 A1 | 4/2024 | Jeon | |
| 2024/0270063 A1 | 8/2024 | Yoon et al. | |

FOREIGN PATENT DOCUMENTS

| | | | |
|---|---|---|---|
| DE | 10130100 A1 | 1/2003 | |
| DE | 103 16 599 A1 | 11/2004 | |
| DE | 10328651 A1 | 1/2005 | |
| DE | 10 2004 038 411 A1 | 8/2005 | |
| DE | 10 2004 006 722 A1 | 9/2005 | |
| DE | 10 2006 002 485 A1 | 9/2007 | |
| DE | 10 2009 002 934 A1 | 11/2010 | |
| DE | 10 2009 002 935 A1 | 11/2010 | |
| DE | 10 2014 100 865 A1 | 7/2015 | |
| DE | 10 2016 201 227 A1 | 8/2017 | |
| DE | 10 2017 222 334 A1 | 6/2019 | |
| DE | 10 2017 222 887 A1 | 6/2019 | |
| DE | 10 2019 116 644 A1 | 12/2019 | |
| DE | 10 2018 222 232 A1 | 6/2020 | |
| DE | 102022205373 A1 | 12/2023 | |
| EP | 0507137 A1 | 10/1992 | |
| EP | 1747930 A1 * | 1/2007 | B62D 7/02 |
| EP | 2 569 205 B1 | 4/2014 | |
| EP | 3 250 441 B1 | 1/2019 | |
| GB | 2165505 A * | 4/1986 | B62D 5/04 |
| JP | H08258728 | 10/1996 | |
| JP | H1111330 A * | 1/1999 | |
| KR | 10-2024-0126598 A | 8/2024 | |

OTHER PUBLICATIONS

German Patent Office, Office Action issued in German patent application No. 10 2021 213 063.1 (Oct. 5, 2022).

German Patent Office, Office Action issued in German patent application No. 10 2021 213 862.4 (Jul. 8, 2022).

United States Patent Office, Non-Final Office Action issued in U.S. Appl. No. 18/055,995 (mailed Feb. 5, 2025).

United States Patent Office, Non-Final Office Action issued in U.S. Appl. No. 18/056,000 (mailed Feb. 14, 2025).

* cited by examiner

STEERING DRIVE FOR A STEERING AXLE
OF A STEERABLE VEHICLE, STEERING
AXLE, AND INDUSTRIAL TRUCK

RELATED APPLICATIONS

This application claims the benefit of and right of priority under 35 U.S.C. § 119 to German Patent Application no. 10 2021 213 063.1, filed on 22 Nov. 2021, the contents of which are incorporated herein by reference in its entirety.

FIELD OF THE DISCLOSURE

The invention relates to a steering drive for a steering axle of a steerable vehicle, according to the preamble of claim 1, and to a corresponding steering axle and a corresponding industrial truck.

BACKGROUND

The prior art has disclosed various embodiments of servo steering units which either assist a manual steering input by a driver or automatically set a desired steering angle in response to an electrical signal. Here, a hydraulic cylinder or an electric motor is commonly used as an actuator. In addition to the actuator, these steering units generally comprise a steering gear of concentric construction and have a shaft as an output. The steering units are of column-like construction with a pedestal in the lower region, which pedestal serves for fastening to a chassis of the vehicle. The upper region of the steering unit is rotatable relative to the lower region in order to set a steering angle at the steerable wheels.

In this context, DE 10 2019 116 644 A1 has disclosed a servo steering unit for vehicles, which servo steering unit comprises a steering column with a pedestal and comprises an electrically assisted steering apparatus with a housing and electric motor, the housing being movable relative to the pedestal with one degree of freedom. The steering column itself furthermore comprises a lower spindle which is rotatably connected to, and partially contained within, the pedestal. The electric motor is configured such that it can set the lower spindle in rotation via an output shaft.

SUMMARY

Known servo steering units however have the disadvantage that, owing to their column-like structural form, they have a large space requirement and are subject to unfavourable mechanical loads, which can in turn lead to increased wear and failure of the servo steering units.

It is an object of the present invention to propose an improved steering drive for a steering axle of a steerable vehicle.

Said object is achieved according to the invention by means of the steering drive for a steering axle of a steerable vehicle according to claim 1. Advantageous embodiments and refinements of the invention will emerge from the dependent claims.

The invention relates to a steering drive for a steering axle of a steerable vehicle, comprising an electric motor with a motor shaft, comprising a first planetary stage with a first sun gear, first planet gears, a first ring gear and a first planet carrier, comprising a final planetary stage with a final sun gear, final planet gears, a final ring gear and a final planet carrier, and comprising a steering lever, the steering drive being configured such that a force flow runs from the motor shaft to the first sun gear, such that the force flow furthermore runs from the first sun gear via the first planet gears to the first planet carrier and to the first ring gear, such that the force flow furthermore runs via the final sun gear and via the final planet gears to the final ring gear, and such that the force flow runs from the first ring gear and from the final ring gear to the steering lever, the steering lever being mounted so as to be rotatable about a pivot axis. The steering drive according to the invention is characterized in that a first sun gear shaft is arranged rotatably within a bore of the final sun gear, and wherein the steering drive is furthermore configured such that the force flow from the electric motor to the first sun gear runs via the first sun gear shaft.

Thus, an electric steering drive is provided that is suitable for actuating the steerable wheels of a steering axle of a steerable vehicle. The steerable vehicle is preferably a utility vehicle, such as an agricultural machine, a work machine or an industrial truck.

The steering drive comprises an electric motor with a motor shaft. The electric motor is preferably a three-phase brushless electric motor. Here, in accordance with an actuation, the electric motor respectively provides the required torque and the required rotational speed. The steering drive furthermore comprises a first and a final planetary stage, having a first and a final sun gear respectively, first and final planet gears respectively, a first and a final ring gear respectively and a first and a final planet carrier respectively, and comprises a steering lever.

A force flow in the steering drive runs from the electric motor or the motor shaft of the electric motor to the first sun gear. The first and the final planetary stage are then arranged such that the force flow runs from the first sun gear via the first planet gears to the first planet carrier and to the first ring gear. From the first planet carrier, the force flow furthermore runs to the final sun gear, and onward from there via the final planet gears to the final ring gear.

Finally, from each of the first and the final ring gear, the force flow runs to the steering lever, which is mounted so as to be rotatable about a pivot axis. Torques and rotational speeds can thus ultimately be transmitted from the electric motor to the steering lever. Here, the transmission of torques and rotational speeds takes place both via the first ring gear and via the final ring gear, for which reason the first ring gear and the final ring gear are also advantageously formed as a single piece.

The steering lever is connected rotationally conjointly to the first and the final ring gear, in particular is formed as a single piece with the first and the final ring gear. In the case of the steering lever being formed as a single piece with the first and the final ring gear, the first and the final ring gear may advantageously, by way of their radial outer surface, form a part of a housing of the steering drive.

The steering lever preferably serves for actuating a linkage of a mechanical steering system of the steering axle, for example via a steering knuckle arm. It is also particularly preferably possible for the steering lever itself to be formed as a steering knuckle arm, in particular of an Ackermann steering system.

The steering lever may alternatively preferably be configured to receive a hub carrier, or it can be formed directly as a hub carrier. It is thus possible for one of the steerable wheels of the steering axle to be arranged directly on the steering lever and steered by the latter. In this case, the pivot axis of the steering lever simultaneously forms a steering axis of rotation of the Ackermann steering system. Wheel forces are transmitted directly into the axle housing via the bearing arrangements of the ring gear. The other steerable wheel of the steering axle may then be steered concomitantly, for example via a steering linkage of the Ackermann steering system.

The first and the final planet stage are advantageously arranged coaxially, such that the pivot axis is simultaneously the axis of rotation of the first and of the second planetary stage.

According to the invention, provision is now made whereby a first sun gear shaft is arranged rotatably within a bore of the final sun gear, and wherein the steering drive is furthermore configured such that the force flow from the electric motor to the first sun gear runs via the first sun gear shaft.

The first planetary stage is thus axially spaced apart from the electric motor by a greater distance than the final planetary stage. The force flow from the electric motor or from the motor shaft to the first sun gear runs via the first sun gear shaft and thus through the bore in the final sun gear, through which the first sun gear shaft is guided. The first sun gear shaft projects beyond the final sun gear in both axial directions, that is to say projects out of the final sun gear in both axial directions.

The first sun gear shaft and the first sun gear are preferably formed as a single piece. It is alternatively preferably also possible for the first sun gear shaft and the motor shaft to be formed as a single piece.

In one preferred embodiment of the invention, provision is made whereby the steering drive furthermore comprises a housing that has a carrier, the carrier being arranged axially between the electric motor and the final planetary stage. Here, the housing of the steering drive makes it possible for all components of the steering drive to be arranged in their respectively required position in or on the housing, and thus for the steering drive to be functional. The housing preferably furthermore has a protective action for the steering drive, in that it keeps in particular contaminants, moisture and other corrosive substances away from those components of the steering drive which are arranged in the housing.

The carrier of the housing is in turn advantageously formed as one or more solid metal plates arranged one on top of the other, which impart additional stability to the housing and thus to the steering drive. The carrier may for example bear the electric motor, that is to say the electric motor is held on or in the housing via the carrier. Furthermore, the carrier may also hold the planetary stages such that these are arranged fixedly in the housing in the intended position relative to the electric motor.

A lower part of the housing is advantageously of pot-shaped form and is in particular connected rotationally conjointly to the first and/or second ring gear and connected rotationally conjointly to the steering lever. The lower part of the housing is particularly advantageously formed as a single piece with the steering lever. This yields the advantage that, by contrast known steering drives, there is no need to provide a rotating shaft end for driving the steering lever, which would have to be mounted and sealed off in oil-tight fashion with respect to the gearbox. Furthermore, no additional structural space needs to be kept in reserve between the steering lever and the shaft end known from the prior art.

In a particularly preferred embodiment of the invention, provision is made whereby the final planet carrier is connected rotationally conjointly to the carrier. The rotationally conjoint configuration may be established for example by way of a spline toothing, by way of a parallel key or by way of two adjacent planar surfaces. By virtue of the final planet carrier being connected rotationally conjointly to the carrier and thus to the housing, the force flow from the final planetary drive can be guided entirely into the final ring gear.

In a further particularly preferred embodiment of the invention, provision is made whereby the carrier has a flange region that is suitable for a screw connection of the steering drive to an axle housing of the steering axle. It is thus made possible for the steering drive to be arranged reliably and rotationally conjointly on the steering axle. A torque of the steering lever can thus be supported on the steering axle. Furthermore, the flange can also be released again relatively easily, for example for the purposes of maintenance or repair.

In a further particularly preferred embodiment of the invention, provision is made whereby the final planet carrier and the carrier are braced axially via a pivot bearing assembly of the pivot lever by means of a locknut. The final planet carrier can thus be easily held in its axial position. Here, the pivot bearing is simultaneously clamped from a first axial direction by the carrier and from a second axial direction by the final planet carrier. An additional clamping means can thus advantageously be omitted. The locknut is advantageously formed as an annular nut with an internal thread.

It is alternatively preferably also possible, instead of a locknut, to use a number of screws which advantageously engage with internal threads of the final planet carrier in order to axially brace the final planet carrier and the carrier, in particular via the pivot bearing assembly.

In a further preferred embodiment of the invention, provision is made whereby a gearbox-side bearing assembly of the motor shaft is arranged in the final planet carrier or in the carrier. In this way, the electric motor can be configured to be axially relatively short, because the gearbox-side mounting of the motor shaft is realized outside the electric motor. It is thus furthermore also possible for the axial overall length of the steering drive to be kept relatively short. If the bearing assembly of the motor shaft is arranged in the carrier, the carrier functionally corresponds to a front bearing shield of the electric motor.

In a further preferred embodiment of the invention, provision is made whereby the steering drive furthermore comprises at least one middle planetary stage which in turn comprises a middle sun gear, middle planet gears, a middle ring gear and a middle planet carrier, the force flow running from the first planet carrier via the middle sun gear and the middle planet gears to the middle planet carrier and to the middle ring gear, and the force flow furthermore running from the middle planet carrier to the final sun gear and from the middle ring gear to the steering lever. Here, the at least one middle planetary stage is arranged between the first planetary stage and the final planetary stage in terms of drive, which means that the force flow is guided from the first planet carrier into a first middle planetary stage and optionally a second, third etc. planetary stage.

If multiple middle planetary stages are provided, it is advantageous for the respective planet carrier of the preceding middle planetary stage to be connected rotationally conjointly to, in particular formed as a single piece with, the sun gear of the subsequent middle planetary stage.

From the final planet carrier of the single or final middle planetary stage, the force flow runs onward into the final sun gear of the final planetary stage. In this case, too, the connection between the middle planet carrier and the final sun gear is rotationally conjoint, and in particular of single-piece configuration.

The middle ring gear is also advantageously formed as a single piece with the first and the final ring gear and with the steering lever.

In a further preferred embodiment of the invention, provision is made whereby the first ring gear, the final ring gear and/or the middle ring gear have identical toothings. In the context of the invention, identical toothings are to be understood to mean that the toothings have an identical diameter, identical tooth flanks, identical tooth tips and identical tooth roots.

In a further preferred embodiment of the invention, provision is made whereby axial plain bearings or axial roller bearings are arranged at planar surfaces of components of the steering drive which are rotatable relative to one another. In this way, the assembly of the steering drive can be simplified in relation to the use of radial bearing assemblies.

In a further preferred embodiment, the first sun gear shaft is connected rotationally conjointly and axially non-displaceably to the motor shaft.

It is alternatively preferably possible for the upper housing, the carrier and the final planet carrier to be formed as a single piece. Here, the bearing assembly is braced by means of a locknut that is screwed together with the lower housing.

The invention also relates to a steering axle comprising a steering drive according to the invention. The advantages already described in conjunction with the steering drive according to the invention are thus also realized for the steering axle according to the invention.

The steering axle furthermore preferably comprises an axle body and two steerable wheels.

The invention furthermore relates to an industrial truck comprising a steering axle according to the invention. The advantages already described in conjunction with the steering axle according to the invention are thus also realized for the industrial truck according to the invention.

BRIEF DESCRIPTION OF THE DRAWINGS

The invention will be discussed by way of example below on the basis of embodiments illustrated in the figures.

In the figures.

DETAILED DESCRIPTION

Identical objects, functional units and similar components are denoted by the same reference designations throughout the figures. These objects, functional units and similar components are of identical design in terms of their technical features unless explicitly or implicitly stated otherwise in the description.

Figure 1:
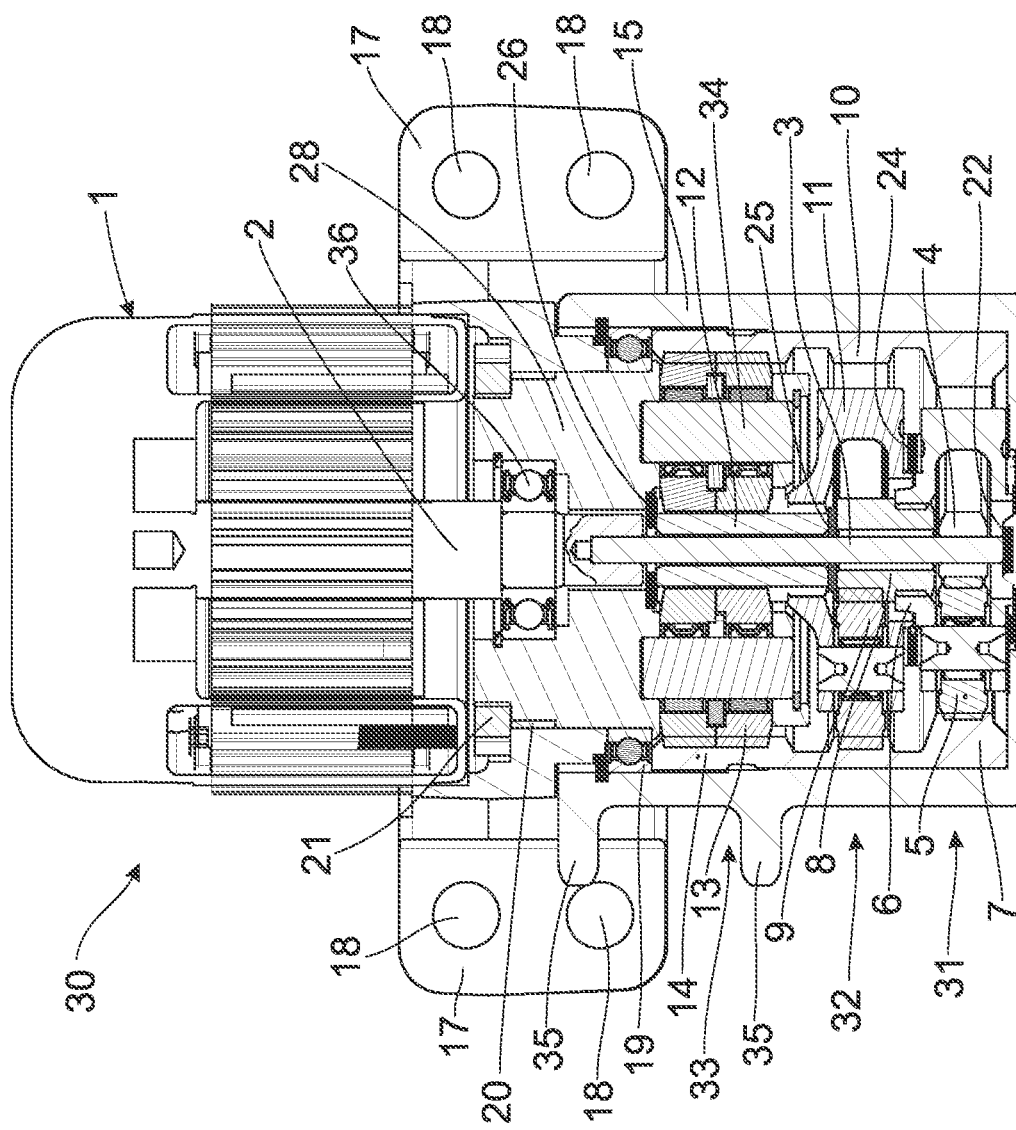
FIG. 1 shows, by way of example and schematically, a possible embodiment of a steering drive according to the invention for a steering axle of a steerable vehicle.

FIG. 1 shows, by way of example and schematically, a possible embodiment of a steering drive 30 according to the invention for a steering axle (not illustrated) of a steerable vehicle (likewise not illustrated).

The steering drive 30 comprises an electric motor 1 with a motor shaft 2 and comprises a first planetary stage 31 with a first sun gear 4, first planet gears 5, a first ring gear 7 and a first planet carrier 6. The steering drive 30 also comprises a first sun gear shaft 3, which is connected rotationally conjointly and axially displaceably to the motor shaft 2 and to the first sun gear 4.

The steering drive 30 furthermore comprises a middle planetary stage 32 with a middle sun gear 8, middle planet gears 9, a middle ring gear 10 and a middle planet carrier 11.

The steering drive 30 finally also comprises a final planetary stage 33 with a final sun gear 12, final planet gears 13, a final ring gear 14 and a final planet carrier 34.

The steering drive 30 of FIG. 1 likewise also comprises a steering lever 35 which is configured as a double lever 35 and which, in the example, is formed as a single piece with a pot-shaped lower part 15 of the housing of the steering drive 30. In this way, there is advantageously no need to provide an oil-tight seal that seals off the steering lever with respect to the gearbox.

In the example, the first ring gear 7, the middle ring gear 10 and the final ring gear 14 are formed as a single piece. The middle ring gear 10 and the final ring gear 14 furthermore have an identical toothing. Only the first ring gear 7 has a different toothing.

The first ring gear 7, the middle ring gear 10 and the final ring gear 14 are connected rotationally conjointly, by way of a spline toothing, to the lower part 15 of the housing and thus to the steering lever 35.

A force flow in the steering drive 30 runs from the motor shaft 2 via a first sun gear shaft 3 to the first sun gear 4. The force flow runs onward from the first sun gear 4 via the first planet gears 5 to the first planet carrier 6 and to the first ring gear 7. Since the first planet carrier 6 is connected rotationally conjointly to the middle sun gear 8, the force flow runs onward from the middle sun gear 8 via the middle planet gears 9 to the middle ring gear 10 and to the middle planet carrier 11. The middle planet carrier 11 is in turn connected rotationally conjointly to the final sun gear 12, and therefore the force flow runs from the middle planet carrier 11 to the final sun gear 12. From there, the force flow runs onward to the final planet gears 13 and to the final ring gear 14. The final planet carrier 34 is connected rotationally conjointly to a carrier 28 of the housing, which carrier is, in the example, composed of two parts connected to one another via a spline toothing 20. The carrier 28 is furthermore connected rotationally conjointly to the electric motor 1. An axis of rotation of the motor shaft 2 of the electric motor 1 is simultaneously the pivot axis 27.

The steering lever 35 can thus be pivoted about a bearing assembly 19 by means of the electric motor 1. A movement of the steering lever 35 in turn causes an adjustment of the steering position of the steered wheels of the steering axle. For example, the steering axle may have an Ackermann steering system that is steered by the steering drive 30. Forces or torques are transmitted via the bearing arrangement 19 into the carrier 28.

Via a flange region 17 with bores 18, the steering drive 30 can be arranged reliably and rotationally conjointly on the steering axle. For the exact alignment of the steering drive 30 with the steering axle, the flange region may for example have alignment pins which can be guided with very little play in corresponding bores of the steering axle.

Furthermore, a bearing assembly 36 of the motor shaft is arranged in the carrier 28, such that the steering drive 30 is of axially relatively short construction.

As can also be seen in FIG. 1, the first sun gear shaft 3 is guided rotatably through a bore of the final sun gear 12 and of the middle sun gear 8.

A locknut 21 braces the final planet carrier 34 together with the carrier 28 via the inner ring of the bearing assembly 19 and thus holds said final planet carrier in position axially.

Components of the steering drive 30 that are rotatable relative to one another are mounted rotatably by means of axial plain bearings 22, 23, 24, 25, 26.

Figure 2:
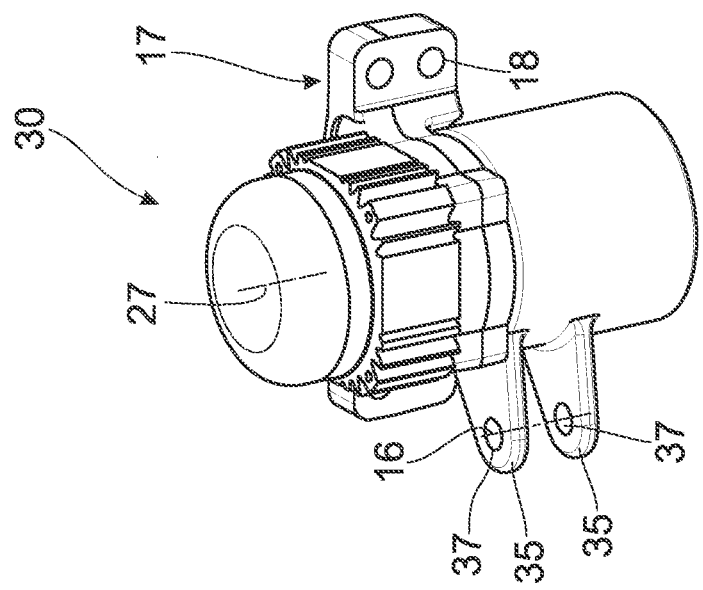
FIG. 2 shows, by way of example and schematically, the steering drive of FIG. 1 in a perspective view.

FIG. 2 shows, by way of example and schematically, the steering drive 30 of FIG. 1 in a perspective view. In particular, the pot-shaped form of the lower part 15 of the housing can be clearly seen in this view.

It is furthermore possible to see the pivot axis 27 and the steering lever 35, configured as a double lever 35, with the lever axis 16 through the bores 37.

REFERENCE SIGNS

1 Electric motor
2 Motor shaft
3 First sun gear shaft
4 First sun gear
5 First planet gear
6 First planet carrier
7 First ring gear
8 Middle sun gear
9 Middle planet gear
10 Middle ring gear
11 Middle planet carrier
12 Final sun gear
13 Final planet gear
14 Final ring gear
15 Lower part of the housing
16 Lever axis
17 Flange region
18 Bore
19 Bearing assembly
20 Spline toothing
21 Locknut
22 Axial plain bearing
23 Axial plain bearing
24 Axial plain bearing
25 Axial plain bearing
26 Axial plain bearing
27 Pivot axis
28 Carrier
30 Steering drive
31 First planetary stage
32 Middle planetary stage
33 Final planetary stage
34 Final planet carrier
35 Steering lever
36 Bearing assembly

The invention claimed is:

1. A steering drive for a steering axle of a steerable vehicle, comprising:
   an electric motor with a motor shaft;
   a first planetary stage with a first sun gear with a first sun gear shaft, first planet gears, a first ring gear, and a first planet carrier;
   a final planetary stage with a final sun gear defining a bore, final planet gears, a final ring gear, and a final planet carrier, wherein the first sun gear shaft is arranged rotatably within the bore of the final sun gear; and
   a steering lever rotatable about a pivot axis;
   wherein the steering drive is configured such that a force flow runs from the motor shaft to the first sun gear, such that the force flow furthermore runs from the first sun gear via the first planet gears to the first planet carrier and to the first ring gear, such that the force flow furthermore runs via the final sun gear and via the final planet gears to the final ring gear, and such that the force flow runs from the first ring gear and from the final ring gear to the steering lever, and
   such that the force flow from the electric motor to the first sun gear runs via the first sun gear shaft.

2. The steering drive as claimed in claim 1, wherein the steering drive further comprises a housing having a carrier, the carrier being arranged axially between the electric motor and the final planetary stage.

3. The steering drive as claimed in claim 2, wherein the final planet carrier is connected rotationally conjointly to the carrier.

4. The steering drive as claimed in claim 2, wherein the carrier has a flange region configured for a screw connection of the steering drive to an axle housing of the steering axle.

5. The steering drive as claimed in claim 2, wherein the final planet carrier and the carrier are braced axially via a pivot bearing assembly of the steering lever by means of a locknut.

6. The steering drive as claimed in claim 2, wherein the motor shaft has a gearbox-side bearing assembly arranged in the final planet carrier or in the carrier.

7. The steering drive as claimed in claim 1, wherein the motor shaft and the first sun gear shaft are formed as a single piece.

8. The steering drive as claimed in claim 1, wherein the steering drive furthermore comprises at least one middle planetary stage which in turn comprises a middle sun gear, middle planet gears, a middle ring gear, and a middle planet carrier, wherein the force flow runs from the first planet carrier via the middle sun gear and the middle planet gears to the middle planet carrier and to the middle ring gear, and the force flow furthermore runs from the middle planet carrier to the final sun gear and from the middle ring gear to the steering lever.

9. The steering drive as claimed in claim 8, wherein the first ring gear, the final ring gear and/or the middle ring gear have identical toothings.

10. The steering drive as claimed in claim 1, further comprising axial plain bearings or axial roller bearings arranged at planar surfaces of components of the steering drive which are rotatable relative to one another.

11. A steering axle comprising the steering drive as claimed in claim 1.

12. An industrial truck comprising a steering with the steering drive axle as claimed in claim 1.

* * * * *